(12) United States Patent
Sato

(10) Patent No.: US 6,433,879 B1
(45) Date of Patent: *Aug. 13, 2002

(54) PRINTING CONTROL APPARATUS AND CONTROL PROGRAM SELECTING METHOD

(75) Inventor: Yasushi Sato, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/448,763

(22) Filed: May 24, 1995

(30) Foreign Application Priority Data

May 31, 1994 (JP) .............................................. 6-118974

(51) Int. Cl.[7] .............................................. G06K 15/00
(52) U.S. Cl. ...................................... 358/1.13; 358/1.15
(58) Field of Search ................................. 395/101, 109, 395/112, 114, 115, 200.3, 200.31, 200.32, 200.33, 200.42, 200.43, 200.44, 200.5, 200.56, 200.78, 800; 358/501, 408, 1.1, 1.4, 1.13, 1.15, 1.16; 709/200, 201, 202, 203, 212, 213, 214, 220, 226, 248; 712/1

(56) References Cited

U.S. PATENT DOCUMENTS

| | | | |
|---|---|---|---|
| 4,747,071 A | 5/1988 | Sato | ...................... 395/200.39 |
| 4,965,771 A | 10/1990 | Morikawa et al. | ........... 395/112 |
| 5,075,874 A | * 12/1991 | Steeves et al. | ............... 395/112 |
| 5,228,118 A | * 7/1993 | Sasaki | ......................... 395/112 |
| 5,293,466 A | * 3/1994 | Bringmann | ................... 395/114 |
| 5,303,336 A | * 4/1994 | Kageyama et al. | .......... 395/114 |
| 5,388,920 A | * 2/1995 | Ohara | ........................... 400/76 |
| 5,392,419 A | * 2/1995 | Walton | ........................ 395/500 |
| 5,455,895 A | * 10/1995 | Hattori | ......................... 395/112 |
| 5,671,341 A | * 9/1997 | Kashiwazaki et al. | ....... 395/112 |
| 5,751,430 A | * 5/1998 | Koike | .......................... 358/296 |

FOREIGN PATENT DOCUMENTS

| | | | | |
|---|---|---|---|---|
| JP | 5-212914 | | 8/1993 | |
| WO | 9012359 | | 10/1990 | .............. G06F/3/12 |

* cited by examiner

Primary Examiner—Gabriel Garcia
(74) Attorney, Agent, or Firm—Fitzpatrick, Cella, Harper & Scinto

(57) ABSTRACT

A printing control apparatus include: plural control programs for analyzing input data entered from plural interfaces for receiving the input data from an external apparatus, thereby generating output data, a memory for memorizing information on the combination of each interface for which one or plural control programs are designated and the control programs, a discrimination device for discriminating the interface used for data input, and a selection device for selecting the optimum control program corresponding to the interface, used for the data input, discriminated by the discrimination device, by referring to the combination information memorized in the memory.

16 Claims, 2 Drawing Sheets

PRINTING CONTROL APPARATUS AND CONTROL PROGRAM SELECTING METHOD

BACKGROUND OF THE INVENTION

1. Field of the Invention

The present invention relates to a printing control apparatus for analyzing input information entered from an external equipment such as a host computer thereby generating and printing output information, and a method for selecting a control program for analyzing the input information.

2. Related Background Art

In the conventional computer system, the printer receives data such as character codes and control codes from a host computer connected thereto and effects printing by converting such data into the internal print data that can be processed by the printer, but such data conversion is generally predetermined uniquely regardless of the input interface used or set manually for example through an operation panel.

Recently there is conceived so-called automatic emulation program switching, which is a method for analyzing the input print data and effecting the data conversion by automatically selecting the data conversion means corresponding to said print data, but, also in this case, selection is generally made from all the loaded data conversion means (for example control programs for analyzing the print data, such as emulation program) again regardless of the input interface.

In such prior technology, however, if the printer is provided with plural interfaces which are respectively connected to host computers releasing print data of mutually different kinds, the printer is not necessarily set, at the printing operation, at the data converting situation matching the host computer which is releasing the print data, and there is required confirmation or re-setting of such data converting situation.

SUMMARY OF THE INVENTION

The present invention is to resolve the above-mentioned drawback, and the object of the 1st to 5th inventions is to provide a printing control apparatus and a control program selecting method, for registering in advance one or plural data conversion means (control programs) corresponding to the interfaces to which the external equipment are connected, then discriminating the interface through which the data are entered and automatically selecting, among the already registered data conversion means (control programs), data conversion means (control program) corresponding to said identified interface, thereby enabling to eliminate, from the selection, the data conversion means (control programs) unnecessary for said interface and to improve the process efficiency for the print data, in comparison with the case of selection from all the data conversion means.

According to a first aspect of the present invention, there are provided plural control programs for analyzing input data entered from plural interfaces for receiving data from external equipment, thereby generating output data; memory means for memorizing information on combination of each interface to which one or plural programs are designated and the programs; discrimination means for discriminating the interface used for data input; and selection means for selecting the optimum control program corresponding to the interface discriminated by said discrimination means by referring to the combination information memorized in said memory means, based on said discriminated interface.

According to a second aspect of the present invention, one or plural control programs, corresponding to each interface, are designated by designation means provided in each host computer.

According to a third aspect of the present invention, the memory means is composed of a non-volatile memory medium.

According to a fourth aspect of the present invention, the interfaces are so constructed as to be connectable to respectively different networks.

According to a fifth aspect of the present invention, there is provided a control program selecting method for use in a printing control apparatus provided with plural control programs for analyzing input data entered from plural interfaces for receiving data from external equipment, thereby generating output data, said method comprising a registration step for registering, in a memory, the information on combination of each interface to which one or plural control programs are designated and the control programs; a discrimination step for discriminating the interface used for data input; and a selection step for selecting the optimum control program corresponding to the interface discriminated by said discrimination step, by referring to the combination information registered in said memory, based on said discriminated interface.

Consequently, according to the first aspect of the present invention, the combination information of each designated interface and the control programs is memorized in the memory means, and the selection means selects the optimum control program, corresponding to the interface discriminated by the discrimination means for discriminating the interface used for the data input, by referring to the combination information memorized in the memory means, based on said discriminated interface, whereby the burden of selecting the control programs corresponding to each interface is alleviated and the optimum control program for the interface used for data input can be efficiently selected.

Also according to the second aspect of the present invention, the control program corresponding to each interface can be designated from the designation means provided in each host computer.

Also according to the third aspect of the present invention, the memory means constituted by the non-volatile enables reproducible reference to the combination information of each designated interface and the control programs corresponding to said interface.

Also according to the fourth aspect of the present invention, there are designated and registered control programs corresponding to the interfaces connected respectively to the mutually different networks, and the optimum control program can be efficiently selected even for the input data entered through different networks.

Also according to the fifth aspect of the present invention, the combination information of each interface for which one or plural control programs are designated and the control programs is registered in the memory, then the interface used for the data input is discriminated, and the optimum control program, corresponding to said discriminated interface, by reference to the combination information registered in said memory, based on said discriminated interface, whereby the burden for selecting the control programs corresponding to each interface can be alleviated and the optimum control program corresponding to the interface used for the data input can be efficiently selected.

DETAILED DESCRIPTION OF THE PREFERRED EMBODIMENTS

Now the present invention will be clarified in detail by a preferred embodiment thereof, with reference to the attached drawings.

At first there will be explained, with reference to FIG. 1, the configuration of a laser beam printer in which the present invention is applied.

Figure 1:
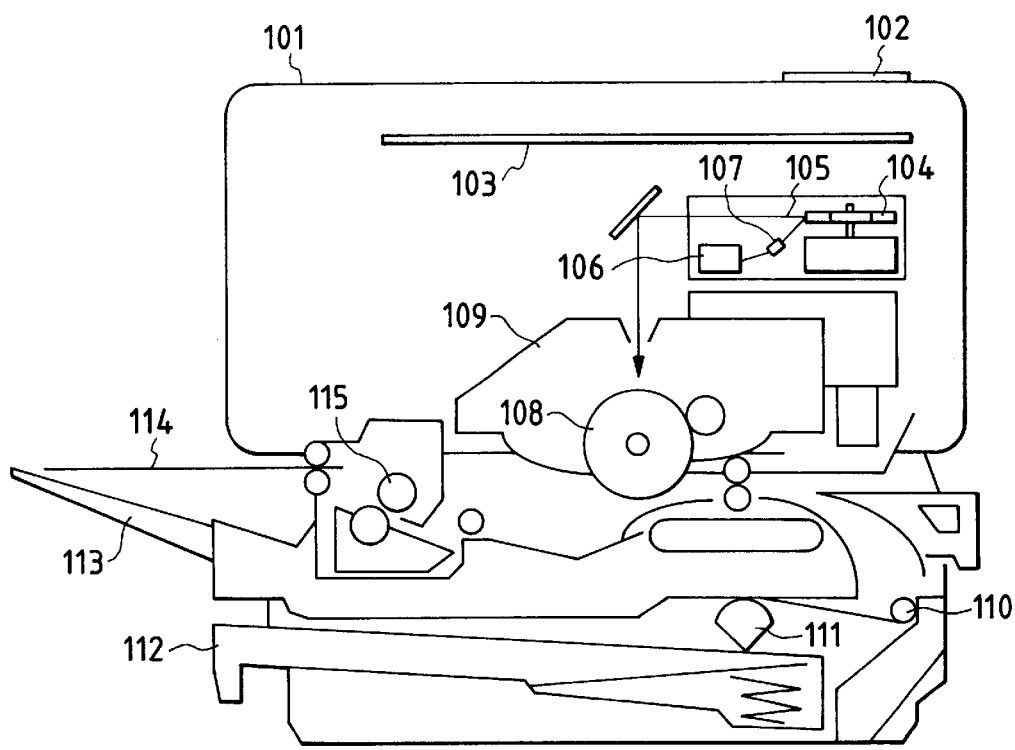
FIG. 1 is a cross-sectional view showing the configuration of a printer engine in a printing system embodying the present invention.

FIG. 1 is a cross-sectional view showing the configuration of a printer engine, composed of a laser beam printer (LBP) engine in this case, of the printing system of the present invention. Said LBP is so constructed that character patterns and document forms can be registered from an unrepresented data source.

A main body 101 of the LBP stores input data, such as character information (character codes), form information and macro instructions, supplied from an unrepresented external apparatus such as a host computer, and generates output data such as the character patterns and form patterns according to said input data, thereby forming an image on a recording sheet. An operation panel 102 is provided with switches for operations, and LED display units and LCD units for displaying the state of the printer. A printer control unit 103 controls the entire LEB 101 and effects analysis of the character information etc. supplied from the external apparatus, thus converting said information into a video signal of corresponding character patterns, for supply to a laser driver 106. The laser driver 106, for driving a semiconductor laser 107, effects on/off control of laser light 105 emitted from said semiconductor laser 107, according to the input video signal.

Said laser light 105 is laterally deflected by a rotary polygon mirror 104 to scan an electrostatic drum 108, whereby an electrostatic latent image of a character pattern is formed thereon. Said latent image is developed by a developing unit 109 positioned around said electrostatic drum 108, and is then transferred onto a recording sheet. Said recording sheet, in a cut sheet form, is housed in a sheet cassette 112 loaded on the LBP 101, then fed into the apparatus by a sheet feeding roller 111 and a transport roller 110 and supplied to the electrostatic drum 108. After the image transfer, the recording sheet 114 is discharged, by sheet discharge rollers 115, onto a tray 113 provided outside the apparatus.

Figure 2:
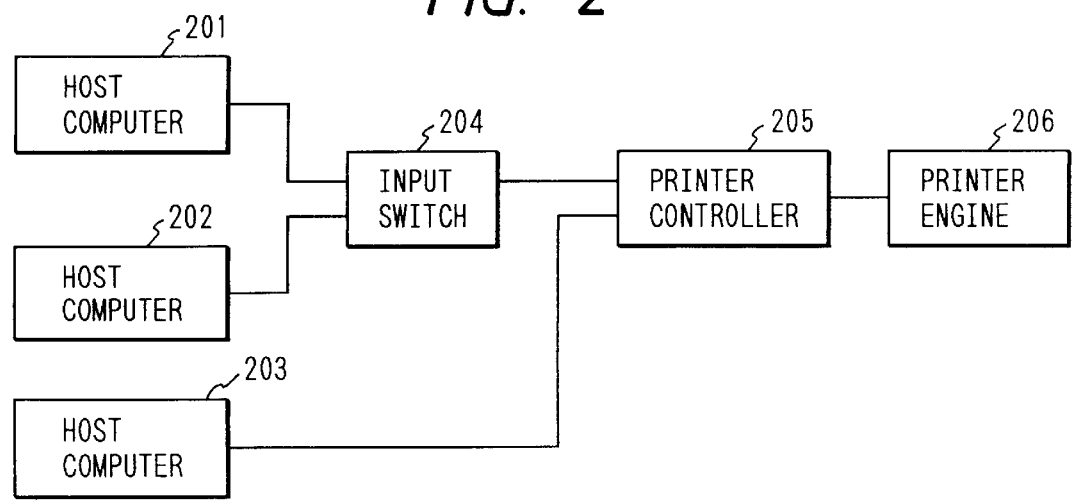
FIG. 2 is a block diagram showing the entire configuration of a printing system constituting an embodiment of the present invention.

FIG. 2 is a block diagram showing the entire structure of a printing system constituting an embodiment of the present invention.

The printing system of the present embodiment is composed of host computers 201, 202 and 203 releasing the input data, an input switching device 204 having two input interfaces and an output interface, a printer controller 205 having two input interfaces and provided with data analyzing processes and a printing device (printer engine) 206.

In the printer controller 205, data analyzing processes corresponding to the two input interfaces are registered in advance.

In the configuration shown in FIG. 2, the input interface connected to the input switching device 204 is connected to two host computers 201, 202, so that two data analyzing processes are registered, corresponding respectively to said host computers 201, 202.

On the other hand, the other input interface is connected only to a host computer 203, so that a data analyzing process is registered corresponding to said host computer 203.

When the host computer 201 or 202 releases the input data, the input switching device 204 transfers the received input data to the printer controller 205. As two data analyzing processes are registered for the input interface at the side of the input switching device 204, the printer controller 205 analyzes the input data and, executing an automatic discriminating process such as a table process, determines the corresponding data analyzing process.

When the host computer 203 releases the input data, they are directly transferred to the printer controller 205. As only one data analyzing process is registered for the input interface at the side of the host computer 203, the printer controller 205 unconditionally determines said data analyzing process.

Utilizing the data analyzing process determined through these processes, the input data are converted into a format that can be handled by the printing device 206, which thus executes the printing operation.

Figure 3:
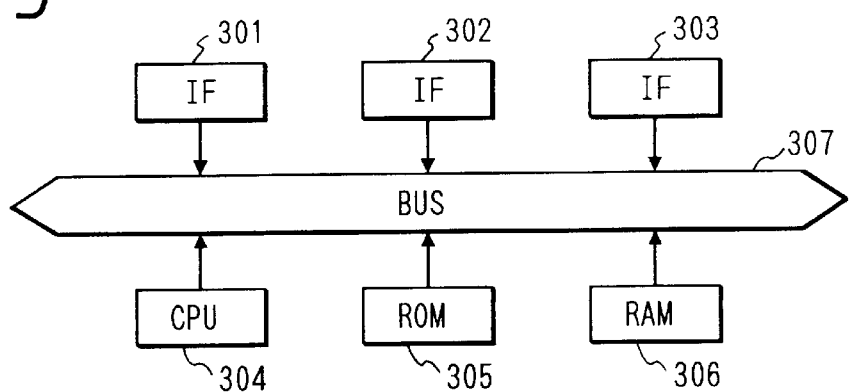
FIG. 3 is a block diagram of a printing control apparatus shown in FIG. 2.

FIG. 3 is a block diagram showing the configuration of the printer controller 205 shown in FIG. 2.

Interfaces 301, 302 are to be connected with the host computers 201–203 for receiving the input data, and an interface 303 is to be connected with the printing device 206 for supplying the output data thereto.

A central processing unit (CPU) 304 in the form of a microprocessor is composed of a sequential circuit structure having a clock pulse generating circuit, delay circuits, gate circuits and other logic circuits.

Figure 4:
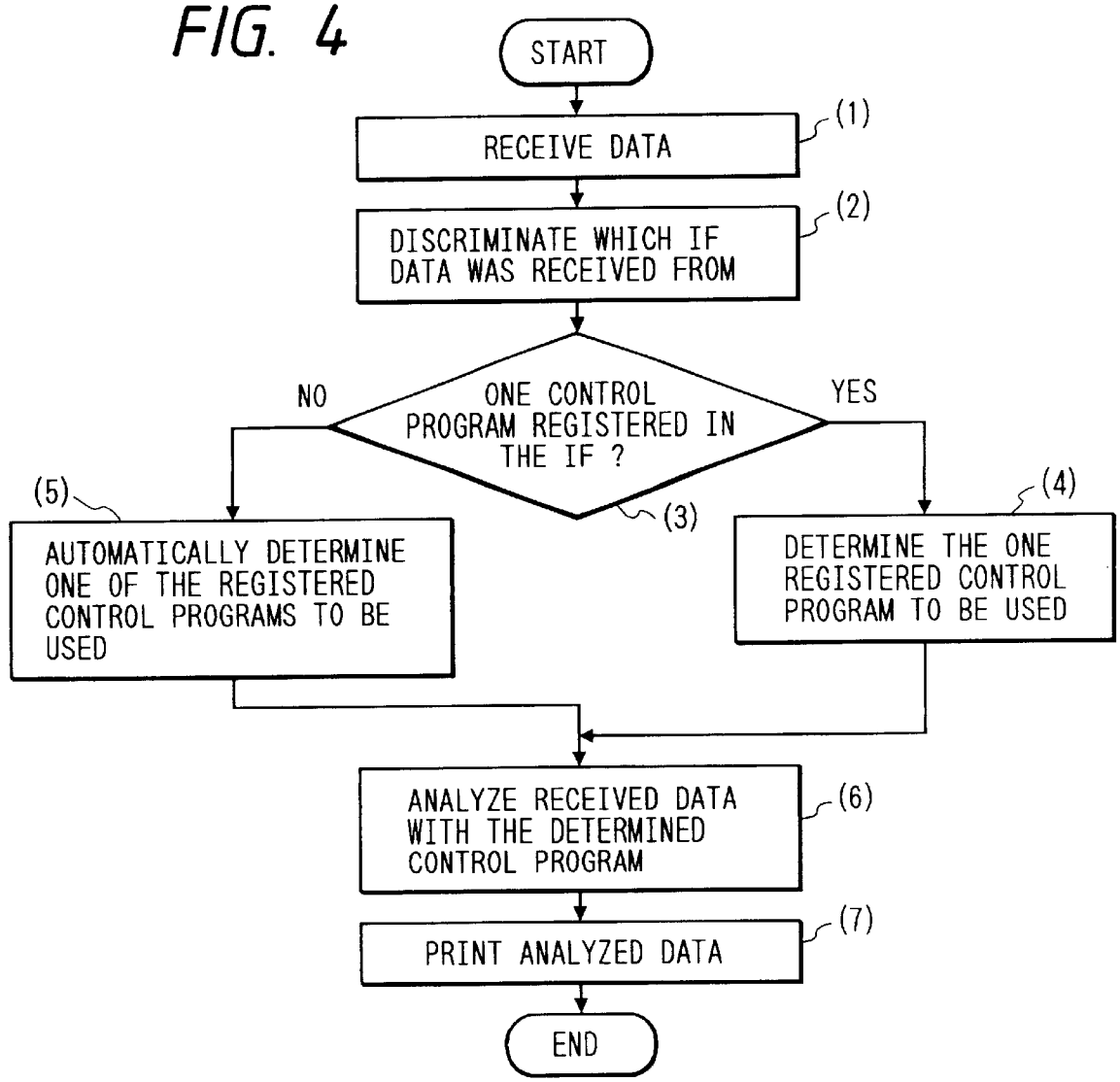
FIG. 4 is a flow chart showing an embodiment of the control method for the printing system of the present invention.

A read-only memory (ROM) 305 stores a program to be executed by the CPU 304, such as the one shown in FIG. 4, and plural control programs for data analyzing process.

A random access memory (RAM) 306 has a memory area for storing the combination information between said CPU 306 and the interfaces 301–303, as well as a work area. A bus line 307 electrically connects said CPU 304 with the interfaces 301, 302, ROM 305 and RAM 306, for transferring memory addresses and various data.

In the following there will be explained the correspondence between the present embodiment and the first to third aspects, and the functions thereof.

According to the first aspect, there is provided a print control device (printing controller) 205 having plural interfaces 301, 302 for data input from host computers; plural control programs for converting the input data, entered from each interface, into code data processable by the printing device (such as emulation programs for analyzing the input data in the present embodiment); designation means (for example an operation panel for entering instructions) for designating one or plural control programs corresponding to each interface; memory means (which is composed of the RAM 306 or may be composed of an unrepresented NVRAM) for memorizing the information on the combination of each interface and the control programs designated by said designation means; discrimination means (composed of the CPU 304 in the present embodiment) for discriminating the interface used for data input; and selection means (composed of the CPU 304) for selecting the optimum control program corresponding to said discriminated interface used for data input, by referring to the combination information memorized in said memory means, based on said discriminated interface. Thus the information on the combination of each interface and the control programs designated by the designation means is memorized in the RAM 306, and the optimum control program is selected corresponding to the interface, used for the data input, discriminated by the CPU 304, by referring to the combination information memorized in the RAM 306, based on said discriminated interface, whereby the burden for selecting the control programs corresponding to each interface can be alleviated and the optimum control program for the interface used for data input can be efficiently selected.

According to the second aspect, the control programs corresponding to each interface can be designated from designation means (for example an unrepresented keyboard) provided in each host computer. Said designation means may also be the operation panel 102 provided in the printing apparatus 101.

According to the third aspect, the combination information of each interface and the control programs corresponding thereto can be referred to reproducibly by the memory means composed of a non-volatile memory medium (unrepresented NVRAM).

In the following there will be explained, with reference to FIG. 4, the correspondence between the present embodiment and the steps in the fifth aspect of the present invention, and the functions thereof.

According to the fifth aspect, in a print control method for a printing system provided, as shown in FIGS. 2 and 3, with plural interfaces 301, 302 for entering input data from host computers 201–203, and plural control programs for converting the input data entered from each interface into code data (intermediate codes) processable by the printing device itself (in the present embodiment, such as emulation programs for analyzing the input data), there are executed a designation step for designating one or plural control programs (for example in an unrepresented initializing process corresponding to each interface; a registration step for registering (for example in an unrepresented initializing process), in a non-volatile memory medium, the information on the combination of each interface and the control programs, designated in said designation step; a discrimination step (steps (1) and (2) in FIG. 4) for discriminating the interface used for data input; and a selection step (steps (3) and (4) or (3) and (5) in FIG. 4) for selecting the optimum control program corresponding to the interface discriminated by said discrimination step, step, by referring to the combination information registered in said non-volatile memory medium, based on said discriminated interface, whereby the burden for selecting the control programs corresponding to each interface can be alleviated and the optimum control program for the interface used for data input can be efficiently selected.

In the following there will be explained, with reference to the flow chart shown in FIG. 4, the control sequence of the printing controller upon reception of the input data.

FIG. 4 is a flow chart showing an example of the control method of the printing system of the present invention, wherein (1) to (7) represent process steps.

When the input data are received from any host computer in a step (1), there is discriminated the interface (IF) used for the data input (step (2)).

In case the CPU 304 discriminates, in a step (3), that the input data have been received from the interface 302, for which only one control program has been registered in advance in the RAM 306, a step (4) determines to use said control program.

On the other hand, if the CPU 304 discriminates, in the step (3), that the input data have been received from the interface 301, for which two control programs have been registered in advance in the RAM 306, a step (5) analyzes the input data and determines either one control program corresponding to the input data, utilizing an automatic discrimination method such as table conversion.

Then a step (6) converts, by data analysis utilizing the control program determined in the step (4) or (5), the input data received in the step (1) into a format processable by the printing device and stores thus converted data into the RAM 306. Said data analysis may include conversion to intermediate codes for enabling high-speed rasterization.

A next step (7) executes the printing operation of the data, converted in the step (6) into the format processable by the printing device, in said printing device.

In the foregoing embodiment, there has been explained a configuration in which the printer controller 205 is provided with two interfaces and the data are received from plural host computers through an input switching device.

However, the present invention is applicable also to printer connected to a network such as LAN, instead of the input switching device. In the following there will be explained the correspondence between the present embodiment and the fourth aspect of the present invention, and the functions thereof. The basic configuration excluding the network is same as that shown in FIGS. 2 and 3.

According to the fourth aspect, control programs are designated and registered corresponding to the interface respectively connected to the mutually different networks NET1, NET2, whereby the optimum control program can be efficiently selected even for the input data entered through the different networks.

More specifically, the printer controller is provided with one or plural input interfaces, and, in case the present printing system is used as a network server printer, the interface 301 is connected to the network NET1 for effecting the printing operation for plural clients. Also the interface 302 is connected to another network NET2 for similarly effecting the printing operation for plural clients.

In such configuration, the clients of the networks NET1, NET2 are not necessarily the host computers of a same kind, so that such host computers may provide input data of respectively different formats.

Therefore, by registering in advance, for each network system, the data conversion processes corresponding to the data formats to be used in such network system, it is rendered possible to effect discrimination only among such anticipated data formats and there can be provided efficient data processing even in a network with a high processing speed. The present invention is applicable not only to so-called single LAN but also to unified LAN such as that known under a trade name Atwork.

In the foregoing description the analysis of the input data is executed by control programs such as emulation programs, but it may also be achieved by data conversion means composed of logic circuits by the functions of the CPU 304.

What is claimed is:

1. A printing control apparatus comprising:

a plurality of interfaces, each of said plurality of interfaces arranged to receive data from an external apparatus;

a memory, arranged to store a plurality of control programs for analyzing data received from the external apparatus and generating output data from the received data;

a designation unit, arranged to designate a plurality of control programs for each of said plurality of interfaces, said designation unit causing said memory to store registration information indicating the plurality of control programs designated by said designation unit, wherein each control program of the plurality of control programs designated by said designation unit is one of the plurality of control programs stored in said memory;

a discrimination unit, arranged to discriminate which of said plurality of interfaces is used for receiving data from the external apparatus; and a selection unit, arranged to select a control program from among the plurality of control programs that are designated by said designation unit for the interface discriminated by said discrimination unit and indicated by the stored registration information, such that the received data is analyzed by the selected control program.

2. An apparatus according to claim 1, wherein said memory comprises a non-volatile memory medium.

3. An apparatus according to claim 1, further comprising a plurality of interfaces, wherein said plurality of interfaces are rendered connectable respectively to different external apparatuses.

4. A control program selecting method for a printing control apparatus that includes a memory having stored therein a plurality of control programs for analyzing data received from an external apparatus and generating output data from the received data, said method comprising the steps of:

providing a plurality of interfaces, each of the plurality of interfaces arranged to receive data from the external apparatus;

designating a plurality of control programs for each of the plurality of interfaces;

registering, in the memory, registration information indicating the plurality of control programs designated in said designating step, wherein each control program of the plurality of control programs designated in said designating step is one of the plurality of control programs stored in the memory;

discriminating which of the plurality of interfaces is used for receiving data from the external apparatus; and selecting a control program from among the plurality of control programs that are designated in said designating step for the interface discriminated in said discriminating step and indicated by the stored registration information, such that the received data is analyzed by the selected control program.

5. A method according to claim 4, wherein the memory comprises a non-volatile memory medium.

6. A method according to claim 4, wherein the printing control apparatus comprises a plurality of interfaces connectable respectively to different external apparatuses.

7. An apparatus according to claim 1, further comprising a discrimination unit, arranged to discriminate from a plurality of interfaces one interface via which data is received.

8. A method according to claim 4, further comprising the step of discriminating from a plurality of interfaces one interface via which data is received.

9. An apparatus according to claim 1, wherein said printing control apparatus is provided in a laser beam printer.

10. An apparatus according to claim 1, wherein each of the plurality of control programs is an emulation program.

11. An apparatus according to claim 1, wherein said selection unit selects a control program from among the plurality of control programs designated by said designation unit by utilizing an automatic discrimination method.

12. An apparatus according to claim 1, further comprising a conversion unit, arranged to convert the received data into intermediate codes by using the selected control program.

13. A method according to claim 4, wherein the printing control apparatus is provided in a laser beam printer.

14. A method according to claim 4, wherein each of the plurality of control programs is an emulation program.

15. A method according to claim 4, wherein said selecting step includes selecting a control program from among the plurality of control programs designated in said designating step by utilizing an automatic discrimination method.

16. A method according to claim 4, further comprising the step of converting the received data into intermediate codes by using the selected control program.

* * * * *